US006871340B1

(12) United States Patent
Gillis

(10) Patent No.: US 6,871,340 B1
(45) Date of Patent: Mar. 22, 2005

(54) SYSTEM AND METHOD FOR GENERATING SOFTWARE TOOLS

(75) Inventor: Philip W. Gillis, Whippany, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/316,040

(22) Filed: May 21, 1999

(51) Int. Cl.[7] .............................................. G06F 9/44
(52) U.S. Cl. ..................... 717/100; 717/101; 717/102; 717/105; 717/109; 717/114; 719/328; 345/594
(58) Field of Search ................................ 717/100–102, 717/105–110, 114, 1, 3, 11; 345/594, 650, 700, 727, 763; 719/328; 707/102; 709/320, 323, 328

(56) References Cited

U.S. PATENT DOCUMENTS

| | | | | |
|---|---|---|---|---|
| 5,301,326 A | * | 4/1994 | Linnett et al. | 709/320 |
| 5,315,703 A | * | 5/1994 | Matheny et al. | 345/700 |
| 5,423,023 A | * | 6/1995 | Batch et al. | 717/1 |
| 5,485,569 A | * | 1/1996 | Goldman et al. | 715/507 |
| 5,754,858 A | * | 5/1998 | Broman et al. | 717/1 |
| 5,852,733 A | * | 12/1998 | Chien et al. | 717/1 |
| 5,859,637 A | * | 1/1999 | Tidwell, II | 345/708 |
| 5,893,105 A | * | 4/1999 | MacLennan | 707/102 |
| 5,966,532 A | * | 10/1999 | McDonald et al. | 717/105 |
| 6,018,627 A | * | 1/2000 | Iyengar et al. | 717/11 |
| 6,053,951 A | * | 4/2000 | McDonald et al. | 717/109 |
| 6,093,215 A | * | 7/2000 | Buxton et al. | 717/1 |
| 6,119,101 A | * | 9/2000 | Peckover | 705/26 |
| 6,170,081 B1 | * | 1/2001 | Fontana et al. | 717/1 |
| 6,182,279 B1 | * | 1/2001 | Buxton | 717/3 |
| 6,282,709 B1 | * | 8/2001 | Reha et al. | 717/11 |
| 6,337,696 B1 | * | 1/2002 | Lindhorst et al. | 345/763 |
| 6,407,753 B1 | * | 6/2002 | Budinsky et al. | 345/764 |
| 6,446,260 B1 | * | 9/2002 | Wilde et al. | 717/173 |
| 6,563,522 B1 | * | 5/2003 | Rosen et al. | 345/854 |
| 6,601,233 B1 | * | 7/2003 | Underwood | 717/102 |
| 6,718,535 B1 | * | 4/2004 | Underwood | 717/101 |

OTHER PUBLICATIONS

TITLE: Creating an Interactive Tutorial for a Web–Based Product, author: Shurety, ACM, 1998.*
TITLE: Case for Web Sites Towards an Integration of Traditional case Concepts and Novel Development Tools, author: Jung et al, ACM, 1998.*
TITLE: Active Documentation: Wizards as a Medium for Meeting User Needs, author: Phelps, ACD, 1997.*
TITLE: A Framework for Visualizing Object–Oriented Systems, author: Haarslev et al, ACM, 1990.*
TITLE: Towards automatic evaluation of multimodal user interfaces, author: Balbo et al, ACM, 1992.*
TITLE: Wizard: Non–Wimp oriented prototyping or direct manipulative behavior, author: Manhartsberger et al, 1994, ACM.*
TITLE: Protoyping an Intelligent Agent through Wizard of Oz, author: Maulsby et al, ACM, 1993.*
TITLE: TaskGuides: Instant Wizares on the Web, author: Tidwell, ACM, 1997.*
Microsoft Press Computer Dictionary, Third Edition, published on 1997.*
TITLE: Arena, Software Tutorial, author: Markowitch et al, 1996.*
TITLE: TaskGuides: instant wizards on the Web, Authors: Tidwell et al, ACM, 1997.*
TITLE: Arena software tutorial, author: Markovitch et al, ACM, Nov. 1996.*
TITLE: Applications of speech recognition in the area of telecommunications, author: Rabiner, IEEE, 1997.*

* cited by examiner

*Primary Examiner*—Chameli C. Das

(57) ABSTRACT

A method and apparatus provide for the creating of a software tool, such as a Wizard, which is easily modifiable and which can simplify a complex procedure. Process steps, such as questions, are prompted and a plurality of potential selections associated with each of the process steps, such as answers to the questions, are also prompted. These process steps are questions and their corresponding answers are then stored and therefrom, a software tool is created.

64 Claims, 22 Drawing Sheets

FIG. 5

| | proc | name | s | s | default | state | text | ty | c | ca | v | itype | URL | terminal |
|---|---|---|---|---|---|---|---|---|---|---|---|---|---|---|
| 310 | 320 | | | 330 | | | 340 | | | | | 350 | 360 | 370 |
| a | 1 | Step 2 | 5 | 0 | No | | Great! Say OK. | | | 0 | | H | | No |
| b | 1 | Step 3 | 6 | 0 | No | | Hit me again | | | 0 | | H | | No |
| c | 1 | Step 4 | 8 | 0 | No | | You said OK. All right!!! Now, hit Yes, and I'll take you to the end. | | | 0 | | H | | No |
| d | 1 | start | 3 | 0 | Yes | | Are you ready to rock? | | | 0 | | H | http://whspider.wh.luc ent.com/~pwg/index. html | No |
| e | 1 | UnknownState | 4 | 0 | No | | | | | 0 | | H | | Yes |

300

SYSTEM AND METHOD FOR GENERATING SOFTWARE TOOLS

BACKGROUND OF THE INVENTION

1. Field of the Invention

The present invention relates generally to software tools and more specifically to Wizards.

2. Background Art

A software tool is a computer program that helps users perform specific tasks. One such known software tool is a Wizard. Software tools, such as Wizards, aid a user in creating various documents or help a user through complex procedures.

Examples of known Wizards include setup Wizards for the installation of software and document creation Wizards within word processing programs, which methodically step a user through the creation of documents. These known Wizards are not easily modifiable and are programmed in code. Wizards hide the complexity of the program from the user, allowing the user to quickly achieve results that would otherwise require much training and skill. Since the programs hide complexity from the users, the programs are often complex themself. Accordingly, an easier way to create and maintain Wizards, and to modify Wizards, is desired.

An example of a Wizard for creating a facsimile coversheet is shown in FIG. 1 as element 10. The Wizard generally displays a sequence block 10a to a user, illustrating each of the steps necessary to create the document, and displays a block 10b to a user, specifically dedicated to a particular step. As a step in the procedure 10a is selected, display 10b changes to correspond to the specifics of the selected step.

Initially, as shown in FIG. 1, a start step 2 begins the procedure. Thereafter, a user selects a next step 4, relating to a document to fax. Once this step 4 is selected, display portion 10b then changes to display a first question 20, and predetermined selectable answers 22. This question 20 is a first one which must be answered when creating a facsimile document, and the possible answers 22 allow for various predetermined variations of the document to be created. Similarly, a next question 2 may be posed as indicated by element 24, with its predetermined set of possible answers 26.

Thereafter, a user selects a next step 6 entitled recipient, and new questions and predetermined possible answers are then displayed in display portion 10b corresponding to the recipient portion of the facsimile document. Step 8 then provides for various types of coversheets to be created, based in various types of fonts for example, and step 12 thereafter allows for modifications of the document relating to the sender, wherein a default name could be entered for example. Finally, upon reaching step 14, the document is completed.

By using the Wizard as shown in FIG. 1, a fax coversheet can be quickly created. However, as previously stated, this fax Wizard has been preprogrammed with perhaps a complex program hidden from the person creating the facsimile coversheet document. It includes only predetermined questions and predetermined selectable answers and therefore is not easily modifiable by a user. In other words, although a user can create a somewhat customized facsimile sheet, the customization cannot in any way be altered by the user. Accordingly, a need for such modifiability exists in the creation of software tools, such as software Wizards.

Additionally, many tasks do not have predesigned Wizards to simplify them. Further, many manuals involve complex inter-dependent procedures which need to be simplified in some way to be more easily understood. Accordingly, a need exists for Wizard-type software tools in many environments, including the simplification of procedural manuals.

SUMMARY OF THE INVENTION

The present invention is directed to a method and apparatus for creating a customizable software tool. In essence, a software tool or Wizard builder is created which prompts input of process or procedural steps and a plurality of selections or answers associated with the steps, stores the input process steps and associated potential selections, and creates a software tool based upon the stored process steps and associated potential selections. As such, a software tool can be created which is easily creatable to suit any environment or problem, and which is further modifiable by the addition or subtraction of process steps and/or potential selections.

BRIEF DESCRIPTION OF THE DRAWINGS

The present invention will become more fully understood from the detailed description given hereinbelow and the accompanying drawings which are given by way of illustration only and are not intended to limit the invention, wherein like reference numerals represent like elements and wherein:

FIG. 5 illustrates a state table;

DETAILED DESCRIPTION OF PREFERRED EMBODIMENT

Figure 1:
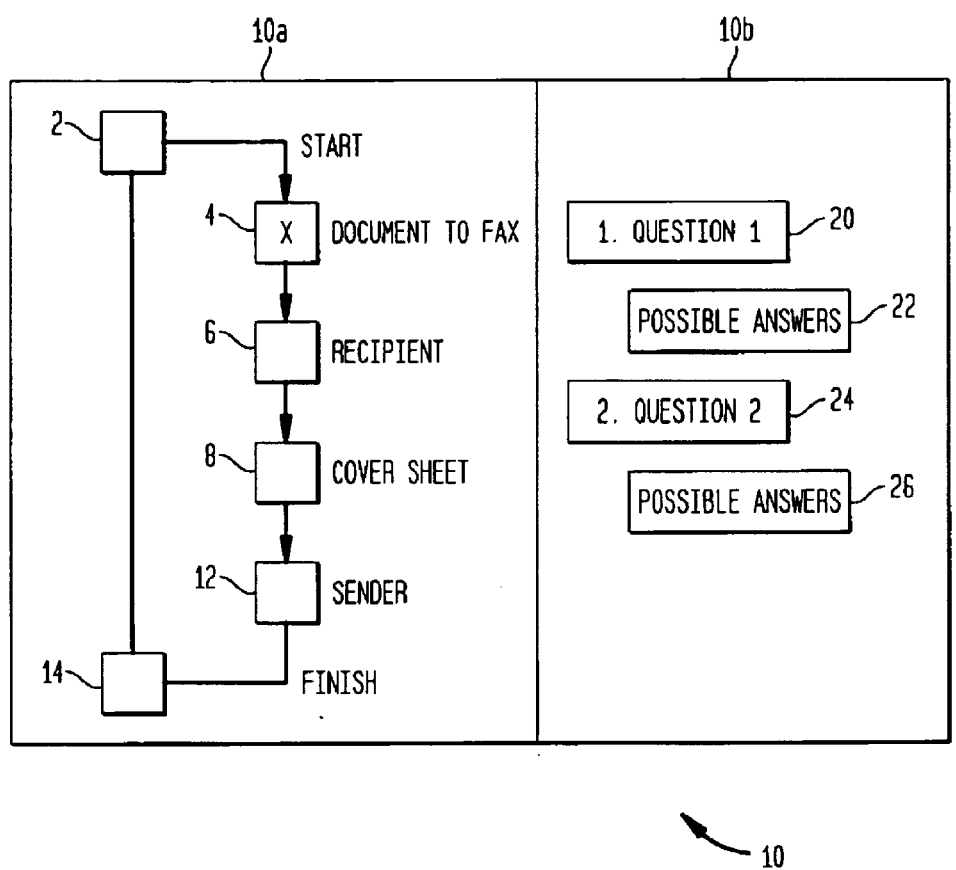
FIG. 1 illustrates an example of a known Wizard.

The present invention is directed to a method and apparatus for creating a software tool, such as a Wizard, to enable a user to easily create a customized tool for performing a specific task, without the need of complex programming, and to enable a user to create a tool which is easily modifiable to meet specific needs. Such a created tool can be one used to simplify a complex document, or to methodically step a user through the creation of an often used document, for example. Thus, unlike known Wizards which are complex to program and which are preprogrammed and non-modifiable, the software tool creation method and apparatus of the present invention enables one to easily create new software tools for any procedure or situation, and further enables the creation of tools which are easily modifiable to provide for the utmost flexibility.

The software tool creation method and apparatus of the present invention is preferably implemented in an apparatus 30, for example, including a CPU 32 operably connected to a memory 34 and an interface 36, and optionally connected, through a second machine interface 38, to any external machine.

The memory 34 stores the software tool creating method or program, the contents of which will be described in more detail with regard to the software tool creator or Wizard builder of FIG. 3. The memory 34 can optionally store a relational data base from which a software tool can be created, including a state table such as shown in FIG. 5 and a state transition table shown in FIG. 6.

A state is essentially a step in a procedure, with a state table being a table of a plurality of states in a procedure and corresponding attributes for each state. A state transition table is one that defines movements from state to state in response to a given input. Thus, in response to an answer selected, the state transition table defines a next-state in a procedure, and additional attributes. The relational data base, including such state tables and state transition tables, can be one as shown in, for example, either one or both of copending application Ser. Nos. 09/182,637 and 09/182,493, respectively entitled "Method and Apparatus for Storing Data as Liquid Information" and "Method and Apparatus for Amplifying Design Information into Software Products", each attributable to the inventor of the present application and each incorporated herein by reference.

The interface 36 can be in the form of an integrated input and display apparatus such as a touch screen, for example, or can include separate input and output interfaces such as a display (output) and a keyboard and/or mouse (input). Alternatively, or in addition, the inputting and outputting of information can be done audibly through a microphone (input) and speaker (output) wherein questions and choices of a created software tool, or prompts for creating a software tool, are audibly output to a user. Accordingly, the interface for inputting and outputting information to and from the CPU 32 can encompass known input and output devices.

Machine interface 38 provides access to an external machine. Thus, the software tool creator of the present invention can implement a software tool including process steps requiring information from an external machine, such as a computer. In the created software tool, the external machine may be designated to provide information in various steps of the created software tool.

For example, a software tool can be created by the apparatus and method of the present invention, which requires data from an external machine. This can be implemented in a process step. In creating the process step, the step is designatable as either a human type or machine type, with the machine type requiring use of a machine interface 38.

A software tool which has been created to implement a machine step may display something to a user during that step, but will not require a user selection. Instead, the machine interface 38 will contact an external machine, provide the external machine with a request for information, and await receipt of the information from the machine. Upon receiving such information, the created software tool then proceeds to the next step, either requiring more machine information or requiring input from a user. Such a machine interface 38, for example, can include a URL address, accessing a particular computer website on the worldwide web, for example, and thus requesting receipt of information external to the apparatus 30.

Figure 3:
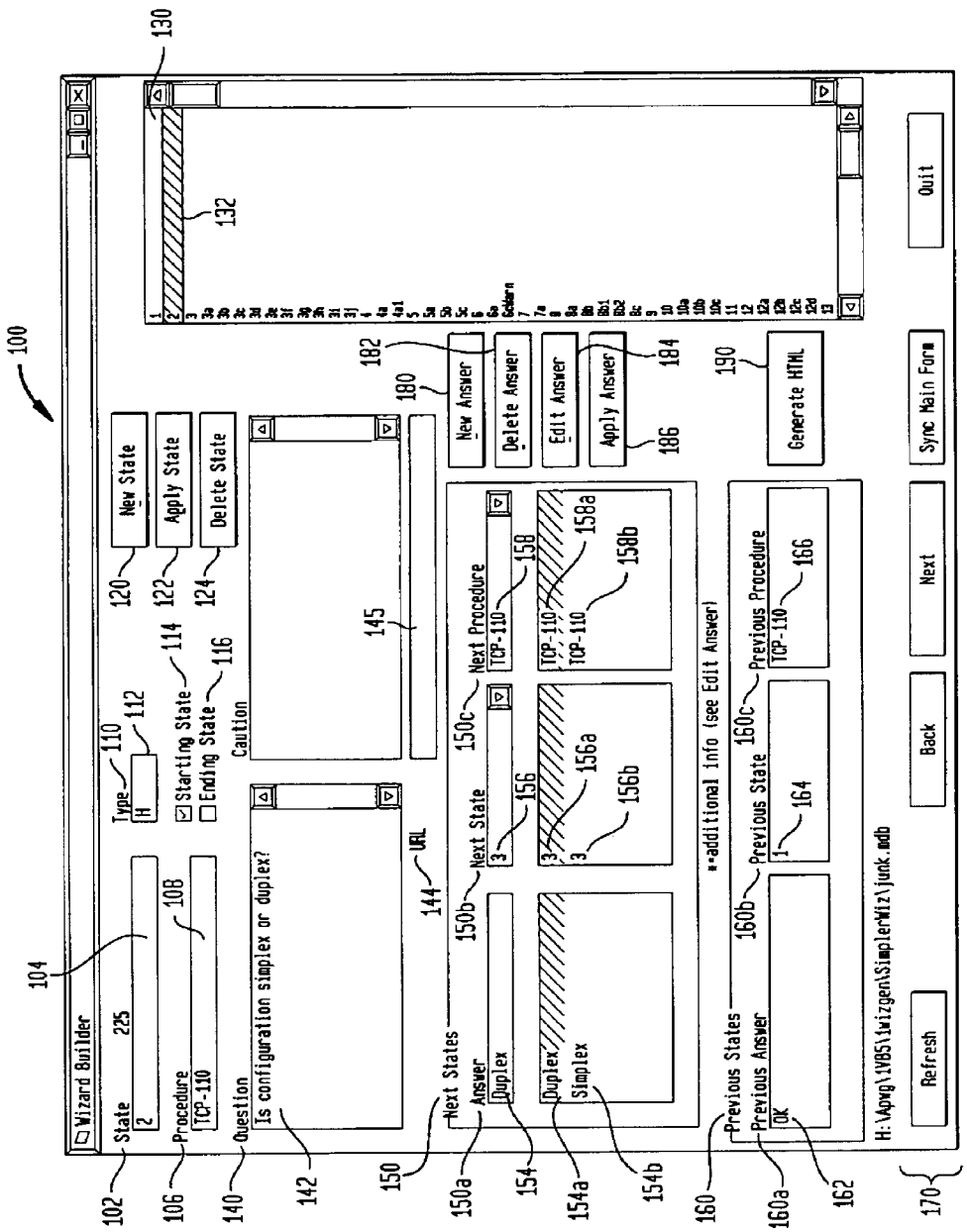
FIG. 3 is a software tool creator of the present invention.
Figure 4:
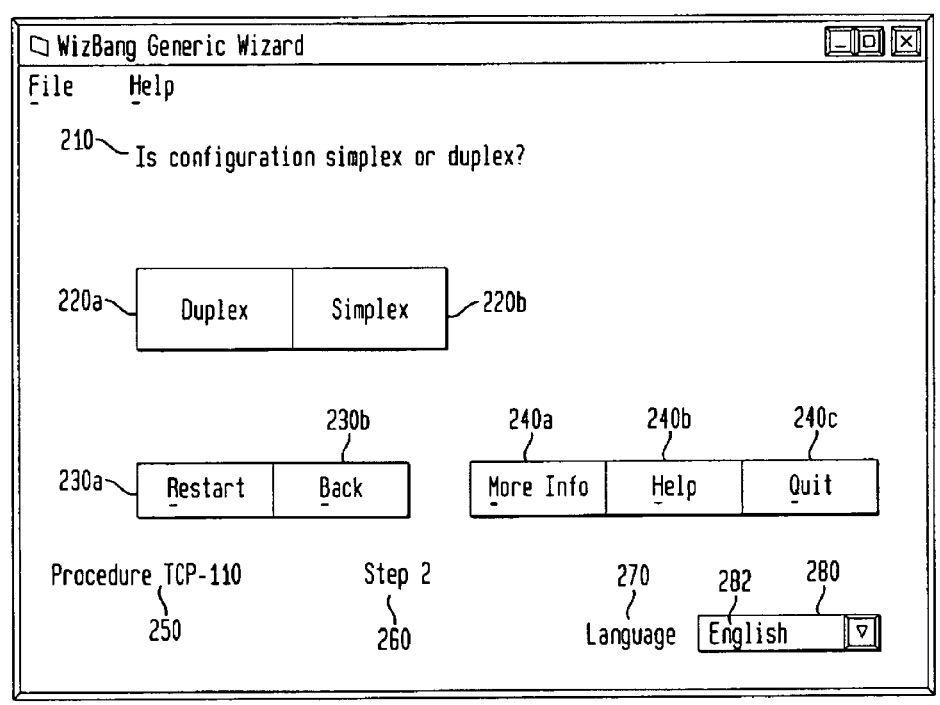
FIG. 4 is a sample screenshot of a Wizard created by the method and apparatus of the present invention.

FIG. 3 illustrates an apparatus for creating a software tool, such as a Wizard, which has been designated Wizard builder 100. The Wizard builder 100 shown in FIG. 3 is implemented in the form of a display requesting input of information, through a keyboard for example, to create a software tool. FIG. 4 illustrates a screenshot corresponding to the information input to Wizard builder 100 of FIG. 3, the screenshot being a screen of a software tool created by the Wizard builder 100 of FIG. 3.

Wizard builder 100 of FIG. 3 includes a first predetermined section 102, corresponding to "state". A "state" corresponds to a step in a process. Accordingly, a user is prompted to input a process step in a first window 104. In the example shown in FIG. 3, the state "2", corresponding to second step in a process, is input into the window 104.

Next, "procedure" 106 is displayed by the Wizard builder 100, prompting input of the procedure title or process to be implemented by the Wizard builder 100, in a second window 108. This procedure 106 will not normally change as the various states change (although a software tool can be created which takes a user through multiple linked procedures), and is an indication of what is being implemented by the Wizard builder 100, namely what is the title of the software tool.

The example software tool shown in FIG. 4 is for reducing a complex manual to a simple procedure, wherein the manual or procedure is entitled TCP-110. As shown in FIG. 4 for example, both the procedure 250 and the step or state 260 are continuously displayed to a user when the created Wizard is displayed. Upon moving to step 3 in the procedure, step 3 will be displayed in the area 260, and procedure TCP-110 will remain in area 250.

As shown in FIG. 3, the Wizard builder 100 preferably additionally displays the type of step or state 110 to be implemented, namely a human step or a machine step. Accordingly, a user is prompted to input either an "M" for a machine step or an "H" for a human step in a third window 112. For a human step, the Wizard builder 100 will thereafter prompt input of process steps and potential selections associated with the process steps, wherein for a machine step, the machine address and information relating to the machine processing will be prompted. In the eventually created software tool, while human steps will require selection of a displayed potential selection, the machine step may be displayed (it may also optionally be hidden from a user), but information will be requested from the machine, and no potential selections from a user will be required.

A starting state window 114 and an ending state window 116 are also displayed by Wizard builder 100, prompting a user to indicate when a certain step is a starting state (first step) or an ending state (last step) in a procedure.

Element 120 is a "new state" button which can be accessed via a mouse or touch-screen for example, as can "apply state" button 122 and "delete state" button 124. Once information corresponding to the state 102, procedure 106, and question or procedural step 140 is input by the user, a state is then applied and the "apply state" button 122 is selected. If a state is no longer desired, the "delete state" 124 button is selected. If an additional state or step in a process is desired, the "new state" 120 button is selected. Thus, any created software tool is easily modifiable by the insertion of new steps or deletion of unwanted steps.

Display area 130 of Wizard builder 100 shown in FIG. 3, preferably displays each of a plurality of steps in the process or procedure, highlighting the current state or step in area 132, such as state 2 in the present example.

Wizard builder 100 further displays "question" 140, prompting input of a question or procedural step to be carried out in another window 142. Thus, the question corresponding to the second state or second step in a process, such as "is configuration simplex or duplex?" in the current example, is input in window 142. As previously stated, a state can be a procedural step for a human to execute (or a question for a human to answer), or a machine state. With regard to machine states, if the machine state requires access to a computer, for example, a computer address may be necessary. Accordingly, the Wizard builder 100 includes a prompt 144, prompting input of a URL address into a window 145. Since the present example shown in FIG. 3 is directed to a human step, not a machine step, the URL address window 145 is blank.

Another section of Wizard builder 100 shown in FIG. 3 involves the prompting of a plurality of potential selections associated with a process step. In other words, a process step can be a question 140, input into a window 142. The potential selections associated with the question, namely the potential answers to the question, are prompted for input by a user, along with next states or steps to be followed if an answer is selected, and even next procedures if, upon selection of an answer, an entirely new procedure or process is to be accessed. Similarly, if a procedural step is input in window 142, choices corresponding to the procedural step are input in window 154.

The "next state" section 150 includes a section prompting an answer 150*a*, a next state 150*b*, and/or a next procedure 150*c*. The answer is input by a user in a window 154, the next state is input to a window 156, and a next procedure is input into a window 158. As shown by element 156, a next state can be a next sequential state (such as step 3, proceeding from previous step 2) or can be a state which skips a next sequential state or step (such as step 4 proceeding from step 2). As shown by the entry in window 158, the procedure input is typically the same procedure as a previous state, although other procedures can be accessed.

An answer most recently input by a user into window 154, along with a most recently input next state and next procedure are highlighted and repeated in subsequent windows 154*a*, 156*a*, and 158*a*. Additional potential selections corresponding to an input question or procedural step, input into window 142 for example, are also displayed in un-highlighted form, as indicated by elements 154*b*, 156*b*, and 158*b*. Thus, a plurality of potential selections are prompted and can be input by a user, associated with each of the process steps or questions.

Further, although not shown, an answer or potential section corresponding to a question or procedural step can be a character string. In other words, the potential selection to a procedural step may merely be a blank area, requesting a user to input a string of characters. Such a lank area would then appear on a display screen of the Created software tool, along with its corresponding Procedural step.

In addition, the Wizard builder 100 also displays previous states in a third section of the display, as indicated by element 160, the previous states including a previous answer 160*a*, a previous state 160*b*, and a previous procedure 160*c*. The previous states displayed in the windows corresponding to each of 160*a*, 160*b* and 160*c*, include respective windows 162, 164 and 166.

Finally, additional buttons are shown on the Wizard builder 100 of FIG. 3, selectable via a mouse or touch screen, for example. These buttons, a first group of which is designated generally by element 170, includes a refresh button, a back button, next button, a sync main form button, and a quit button. The back and next buttons allow access to a next step or previous step, and the quit button allows the user to complete a creation of a Wizard.

The "refresh" button discards any user-entered data in the current state and refreshes the screen with data from the database. With regard to the "sync main form" button, this is a type of sync button for the Wizard or software tool itself. It sets the current state of the software tool to the current state as shown on the Wizard builder 100 and brings the window (of the software tool) to the front of the display and makes it active. In other words, it is a way to immediately test what has been created based on entered data.

Additional buttons 180, 182, 184 and 186 correspond to the "answer" or potential selection section of Wizard builder 100, wherein a new answer or potential selection is added by hitting button 180; a new answer or potential selection is applied to an actual procedure or created software tool by hitting button 182 (similar to applying a state of the Wizard by hitting button 122); an answer or potential selection is deleted by selecting button 184; and finally an answer or potential selection is edited by selecting button 186.

Accordingly, through the use of such buttons, and through the use of buttons for new state, applying a state, and deleting a state, a software tool cannot only be created by the Wizard builder 100, but an existing software tool can be modified. For example, to add a step to an existing software tool, a stored software tool is first recalled from memory and the Wizard builder 100 then adds an input new step when the new state button 120 is activated. The state is then applied to the stored procedure as a new step when button 122 is activated.

Similarly, to delete a step from a stored software tool, the delete state button 124 is activated. Thus, unlike known Wizards which are preprogrammed and non-modifiable, the Wizard builder 100 of the present invention cannot only easily create new software tools for any procedure or situation, but can also modify existing software tools to thereby provide for the utmost flexibility.

Similarly, not only can steps or states be added, deleted or modified, but so can answers or potential selections associated with each of the process steps or state. If a new answer or potential selection is to be added, new answer button 180 is selected, and then the answer is then applied to an existing software tool by activating button 182. Similarly, an answer or potential selection is deleted by activating button 184, or is modified by activating button 186. This again allows for utmost flexibility such that an existing software tool, created by Wizard builder 100, is easily modifiable to suit a user's needs.

Finally, a button 190 exists for generating HTML (hypertext markup language) file(s) containing properly formatted state transition table and state table information. It is used to generate procedure information in a form suitable for review, by people such as system engineers and procedure designers.

Note that while a display has been depicted in FIG. 3 for prompting information and for receiving information in response to prompts, such prompting and receipt of information can be done by other means, such as audibly, for example.

Once information has been prompted and entered for states, state transitions, and answers, such information is assimilated to create a software tool. In the process, the software tool creator may form and store state tables with corresponding attributes, and state transition tables defining movement from state to state. From this information, software tools such as that shown in FIG. 4 are created, which output the input process steps based upon input selection.

FIG. 4 is an image of a computer screen 200 (or screenshot), displaying a software tool. created by Wizard builder 100. The display screen 200 corresponds to the exemplary question input in window 142 of the Wizard builder 100 shown in FIG. 3, with such a question being displayed in a created software tool in display area 210 of FIG. 4. Additionally, the created software tool, based upon the example of FIG. 3 where two potential selections associated with the question displayed in area 210 of FIG. 4 have been input into window 154 of Wizard builder 100 of FIG. 3, displays two potential answers. These potential answers, displayed in the form of buttons 220a and 220b, are associated with the question displayed in area 210, and provide a user of the created software tool with two choices as answers to the question posed in section 210. A mouse can be used, as can a touch screen, to select either button 220a or 220b and depending upon which one is selected, the software tool will then move to a next screen, corresponding to a next state in the process. In the present example as shown in FIGS. 3 and 4, for selection of either the duplex or simplex answer, the next state or step will be step 3.

Although not shown in FIGS. 3 and 4, a choice or answer corresponding to a question can be not only a preselected choice, but can be a blank window, prompting a user to input whatever information is desired. In other words, if the software tool created is that of a fax coversheet, for example, the process step shown in step 210 could direct a user to input name of sender. In a third area 220c (not shown in FIG. 4), a blank window could be included which, when selected, allows for a user to input his or her name. To more clearly illustrate this aspect, reference is made to FIGS. 3a, 3b and 4a.

Figure 3A:
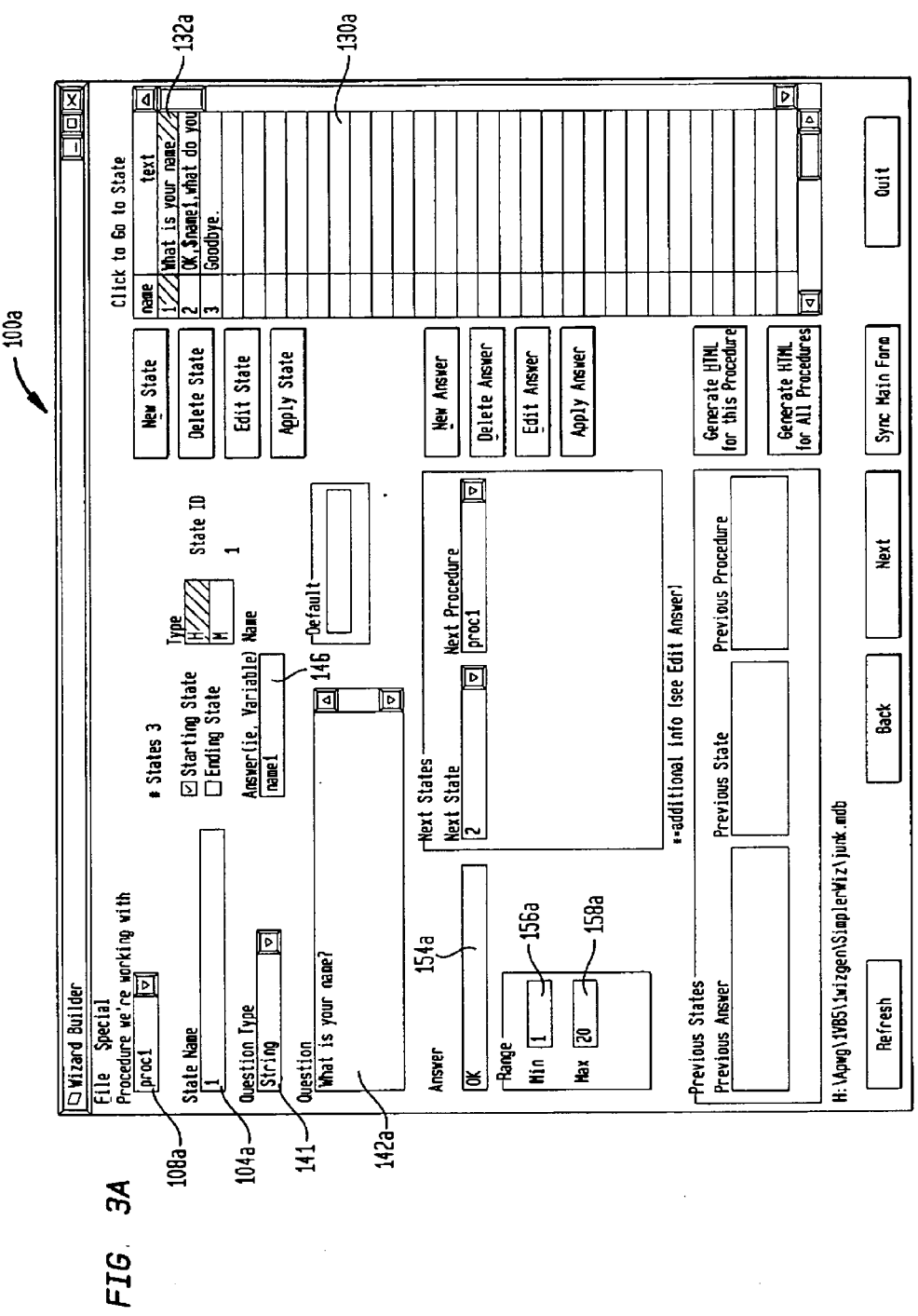
FIGS. 3a and 3b illustrate additional aspects of the software tool creator of the present invention.

FIG. 3a shows a Wizard builder 100a, basically the same as but slightly modified from the Wizard builder 100 of FIG. 3. Similar to Wizard builder 100 of FIG. 3, Wizard builder 100a includes a section 108a for entry of the procedure; a section 104a for entry of the state name; a section 130a listing all states in a procedure, highlighting the current state in area 132a, etc. The Wizard builder 10a of FIG. 3a further illustrates a window 141 which permits selection of a question type. As shown in window 141 of FIG. 3a, one such question type is a "string". Selection of "string" as a question type creates a software tool which prompts a user to input a character string in response to the question posed. Such a question is input into window 142a. The range of the string permitted is then input into windows 156a (minimum) and 158a (maximum). A software tool, as shown in FIG. 4a, is then created from which the input process steps are executed based upon input selections.

Figure 4A:
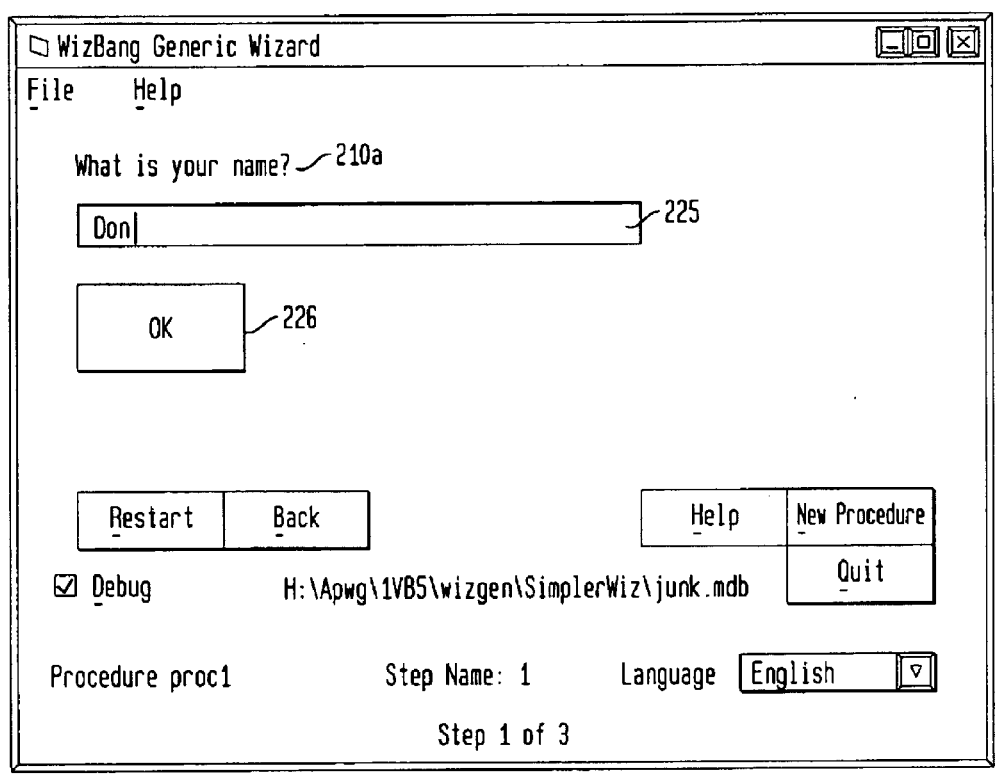
FIG. 4a is another sample screenshot.

FIG. 4a is an image of a computer screen (or screenshot), displaying a created software tool. As shown by element 210a of FIG. 4a, in the created software tool, the question is displayed. In the present example, the question "What is your name?" was input into window 142a of the Wizard builder 100a of FIG. 3a, and that question is displayed in the created software tool. A blank window 225 of FIG. 4 is then displayed, prompting a user to input a string of characters (numbers, letters, etc.) as a variable answer to the question. In the example shown in FIG. 4a, the name "Don"has been entered by the user. Thereafter, since the default "OK" is shown in the answer window 154a of Wizard builder 100a of FIG. 3a in the present example, an "OK" button 226 is displayed to the user in the screenshot of the created software tool of FIG. 4a. The user then hits this button after the character string has been entered in window 225 to move to step 2 of the procedure.

Figure 3B:
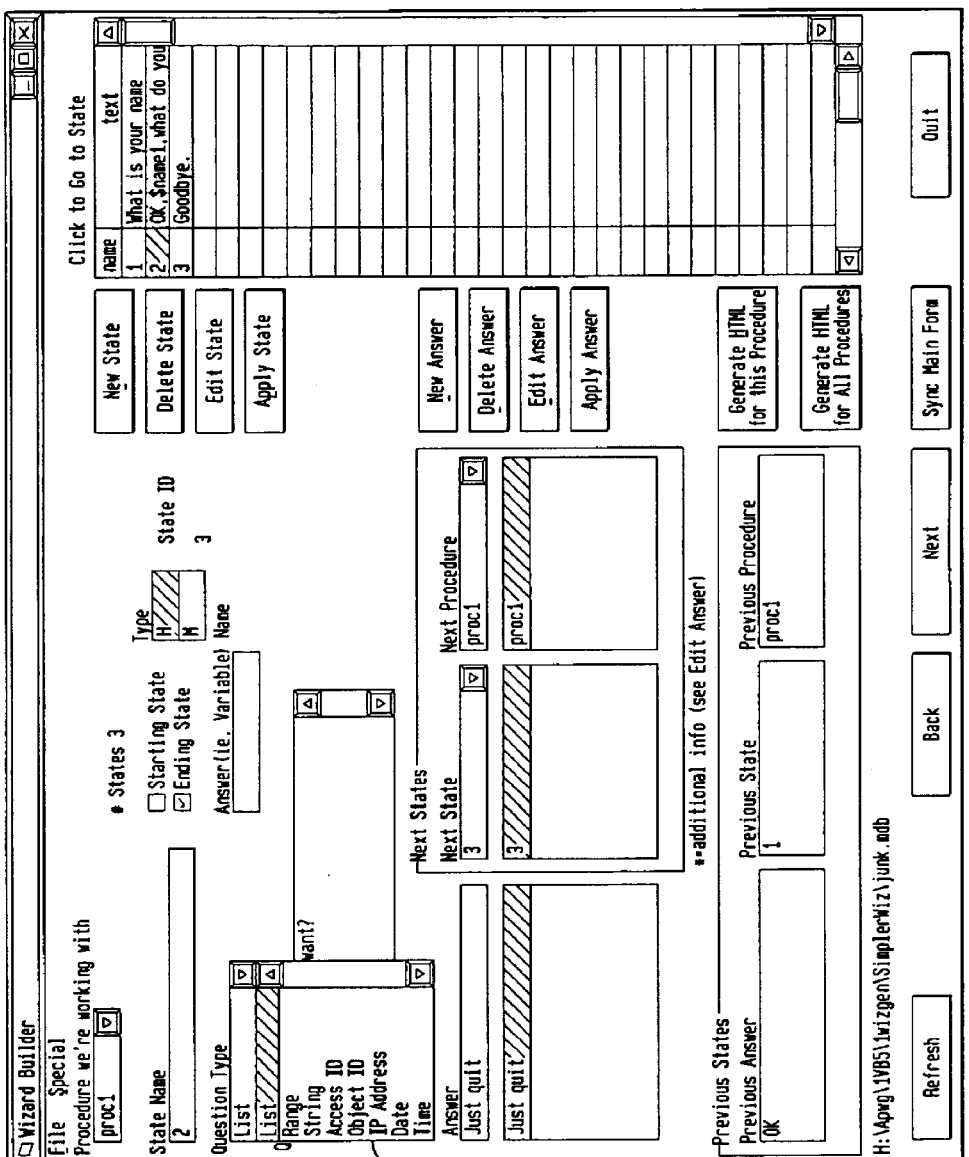

FIG. 3b illustrates another Wizard builder 100b, basically the same but again slightly modified from the Wizard builder 100 of FIG. 3. Again, many similar windows are shown, which will not be discussed further for the sake of brevity. The Wizard builder 100b illustrates that not only can a selectable question type include "string", but other question types are also selectable via drop-down selection box window 141a. These include, but are not limited to: lists, ranges, strings, access IDs, object IDs, IP addresses, dates, times, etc. Thus, as basically shown in FIG. 4a, when the created software tool encounters any one of the selected question types, it displays the entered question, a blank window (such as a blank text-box or character box) in which a user of the created software tool can type an answer, and an "OK" button to hit when the answer has been entered (optionally, for example, a user could hit an "enter" key on a keyboard instead of the "OK" button), or a list of allowed answers.

Additionally, the Wizard builder 100a of FIG. 3a also includes a window 146 labeled "Answer (i.e., Variable) Name". This allows one to name a variable in which the created software tool can store a user's answer. For example, such an aspect can be optional for list-type questions and mandatory for string-type questions. Thus, an input string answer will be stored. These answers can further be used in other questions and in machine-interface code.

For questions, the simple way to do this is to prepend a marker (such as a dollar sign "$"). Thus, if question one is "What is your name?", and an answer of "Don" is entered, then a subsequent question may say "OK Don, what do you want to do now?"

As shown in FIG. 4, buttons such as buttons 230a and b, and 240a to c are typically displayed in a created software tool. These buttons can be selected by a user, via a touch screen, or can be selected through the use of a mouse or keyboard for example. The restart button, 230a, restarts the entire software tool at the first state or step, displaying the first process step. The "back" button 230b, allows the user to move to a previous step in a procedure. The "more-info" button 240a and help button 240b, provide a user further information corresponding to a process step or selectable answer, or provide a user with additional information to aid them in answering a particular question, respectively. For example, "More Info" could bring up a Web browser or fancy display of some kind, while "Help" might bring up the standard help aspect of the operating system. The button 240c allows the user to quit using a particular software tool created by the Wizard builder 100 of FIG. 3.

Finally, as shown in FIG. 4, the procedure corresponding that input in window 108 of FIG. 3, is displayed as element 250. Also, the step input in window 104 of FIG. 3, is displayed as element 260. This lets a user know which procedure and step are being executed.

As previously indicated, the interface 36 of the Wizard 200 can be visual or audible. Similarly, audible output or visual output are not limited to the English language. For example, in a section 270 shown in FIG. 4, one of a plurality of languages is selected from an area 280, such as English designated by 282. Using an arrow in area 280, one chooses from a plurality of predetermined languages (from a pull-down window for example) in which to display or audibly output the process steps and potential selections associated with the process steps for the software tool, such as English, French, Spanish, etc. Thus, the process steps and potential selections associated with the process steps in the generated software tool can be audibly output or displayed in any one of a plurality of languages.

FIG. 5 is an example of a sample state table 300, listing a plurality of states or steps in a procedure, and corresponding attributes. This state table 300 is compiled from prompted and input state and attribute information and stored in memory 34, for example. Information from the state table 300 is then used to generate a software tool.

The state table includes, for example, a first column 310, corresponding to the overall procedure or method. As shown, each of the five rows a–e of state table 300 all correspond to the same procedure, namely procedure 1. The second column of the state table 320, indicates a step in the procedure, such as step 2, step 3, etc. A third column 330, corresponds to an attribute of the step, indicating whether or not a step is a default step. In this example, only row d, the start step, is such a default step. The next column 340 indicates the text of the step, namely the question or process corresponding to the step.

The fifth column 350 of state table 300 corresponds to another attribute indicating the step type, namely human or machine. The sixth column 360 corresponds to an optional attribute, a URL address, wherein row d is the only step with a URL address. The final column 370 corresponds optionally to a terminal (ie, ending) state. Accordingly, input procedures, states, questions, etc., may be stored in a state table such as that of FIG. 5 for example, or information prestored in such a format may be used, to create a software tool using Wizard builder 100. Similarly, information stored in a state transition table such as that shown in FIG. 6, or information prestored in a state transition table may be used.

Figure 6:
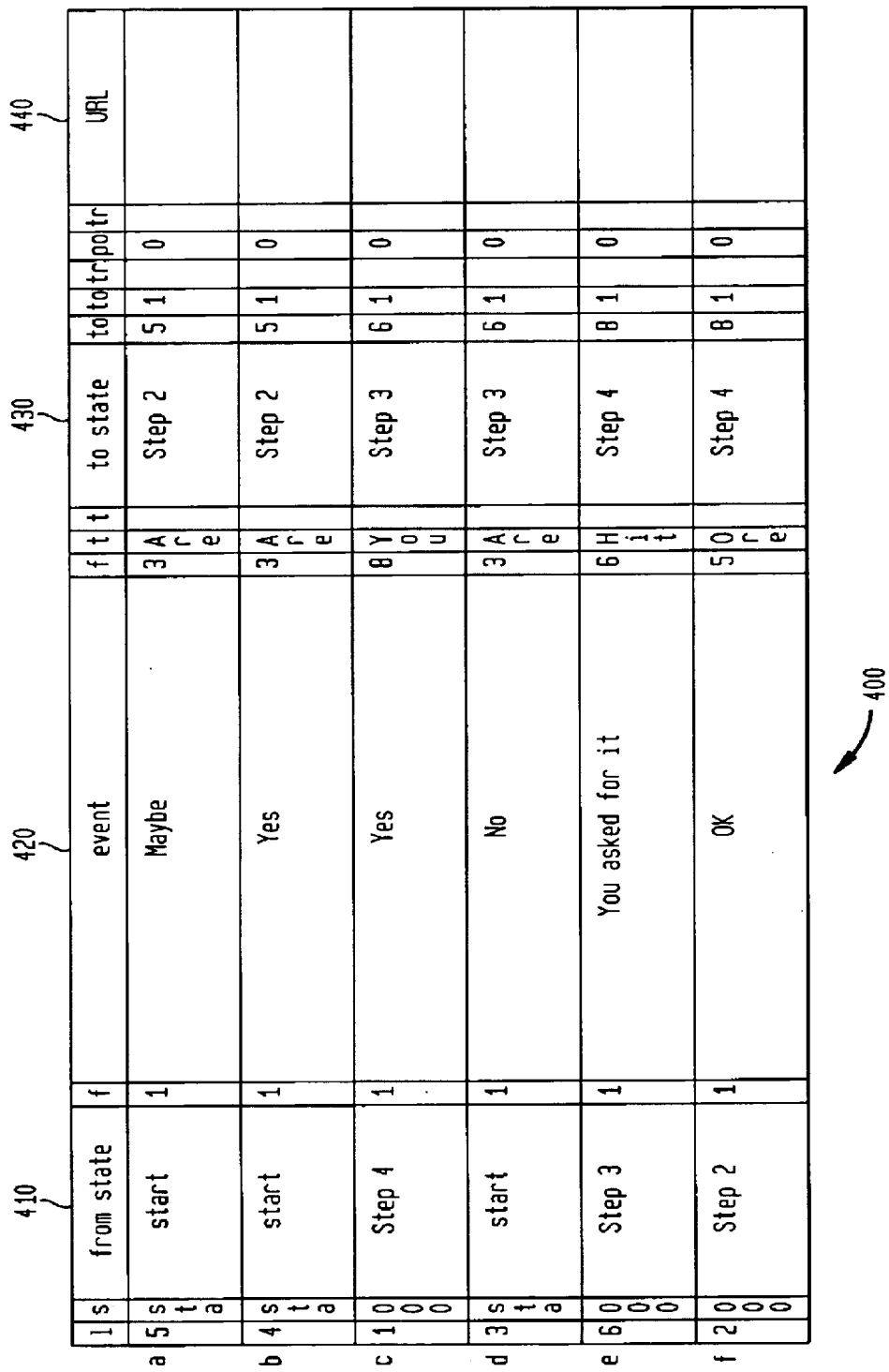
FIG. 6 illustrates a state transition table.

The state transition table shown in FIG. 6, listing movements from state to state in response to a given input, is stored in memory 34, for example. It can be created from input state transition information (or prestored) and used in conjunction with the state table shown in FIG. 5 in the creation of a software tool utilizing Wizard builder 100 of FIG. 3 for example. The state transition table 400 includes, for example, a first column 410, indicating a "from state" or current step in a procedure; a second column 420 corresponds to an event or answer to the current question or step; and column 430 corresponds to a "to state" or a "next" state in a procedure.

Accordingly, as shown in row a of FIG. 6, for example, if a current state is start, and either the event "maybe" or "yes" is selected, then the created software tool moves to the "to state" or "next state", namely to step 2 in the process. Alternatively, if the event (answer) selected after the start step is no, the created tool moves to step 3 in the process (as shown in row d for example). Additionally, a URL address can optionally be input in a fourth column 440, if necessary. Additionally, it should be noted that the state table and state transition table can be stored in a relational data base, from which such a software tool is created, such as that described in copending application Ser. Nos. 09/182,637 and 09/182,493, respectively entitled "Method and Apparatus for Storing Data as Liquid Information" and "Method and Apparatus for Amplifying Design Information into Software Products", the entire contents of which are incorporated by reference.

The Wizard builder 100, 10a and 100b of the present invention allows a user to read, enter, and edit information, such as information in the form of a state table and a state transition table for example, in an efficient way to create an effective software tool. Such tables are preferentially stored in a relational database.

To achieve the desired result, all states are listed in window 130 of FIGS. 3, 3a and 3b, and a user chooses one. Choosing one fills windows in the top half of the screen (above window 150) of the Wizard builder, displaying important information about the state. The top half of the screen contains windows and controls that display and allow editing of attributes of the current state. Since there may be more information than can fit on one screen, an edit state button can be used to bring up another screen or screens to enter the lesser-used state information.

The top part of the bottom half of the screen (from window 150 and below) of the Wizard builder of FIGS. 3, 3a and 3b allows a user to read, enter, and edit state transition table information (answer information), referring to possible answers to the current question and their next states. An Edit Answer button can then be used to bring up additional screens if necessary. Finally, the bottom part of the bottom half of the screen provides controls for navigation and miscellaneous functions, such as navigation aids for moving among states and provides miscellaneous functions (such as generate HTML).

Hereafter, an example of a procedure implemented into a software tool by Wizard builder 100 will be discussed, along with display screens (screenshots) of the resulting software tool. The Wizard builder 100 of FIG. 3 is utilized to create a software tool from the flowchart of FIG. 7, wherein the various screenshots of the software tool are shown in FIGS. 8 to 11.

Figure 7:
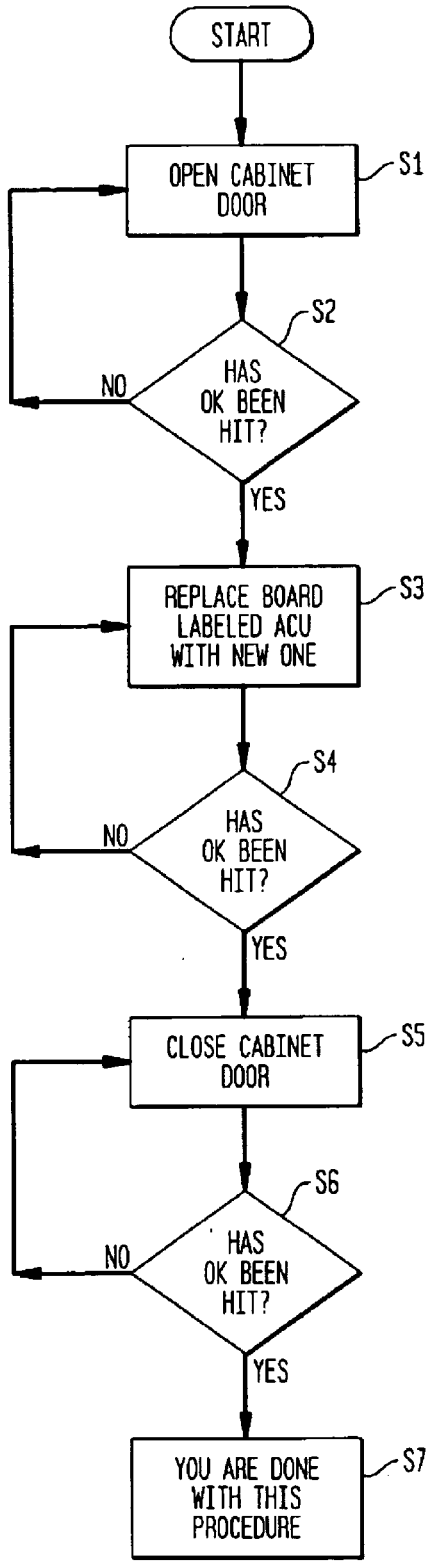
FIG. 7 is a flowchart of a process to be implemented into a software tool.

Initially, in creating a software tool from the Wizard builder 100 of FIG. 3 of the present invention, a flowchart such as that shown in FIG. 7 can be, but not need be, created. Any process or procedure can be used to create a software tool using Wizard building 100. The present example is illustrated in flowchart form for illustrative purposes only.

The first step of FIG. 7, step S1, is a procedural step stating "open cabinet door". In step S2, it is questioned whether or not "ok" has been selected (indicating that a procedural step has been completed) and if so, the process proceeds to step S3.

Figure 8:
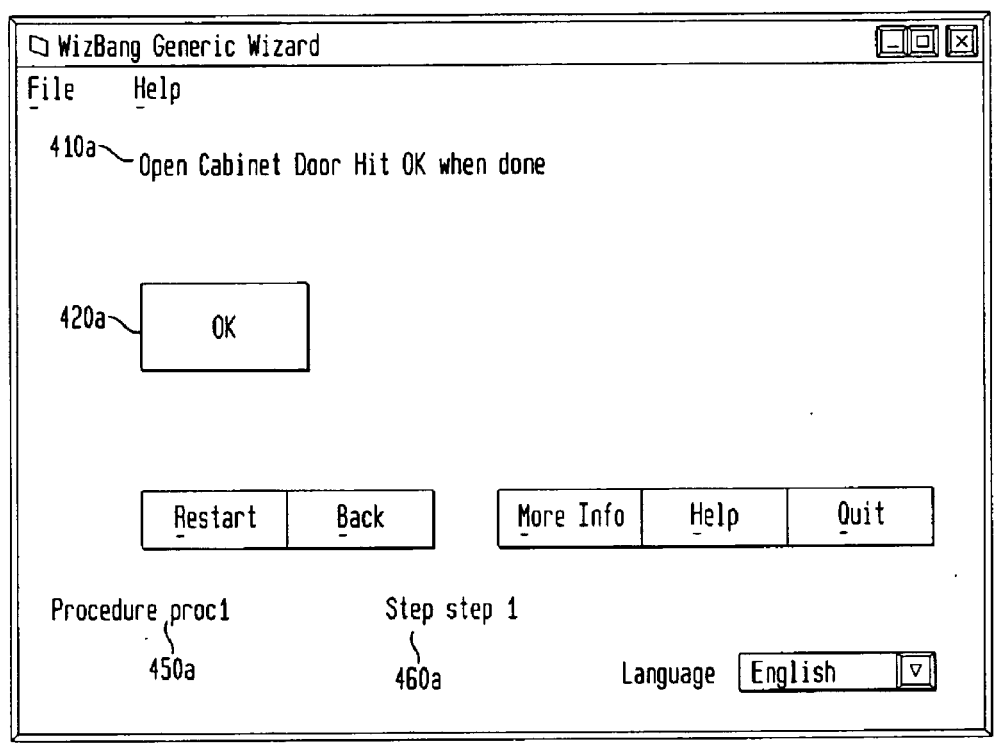
FIGS. 8 to 11 are sample screenshots for the software tool created to implement the procedure of the flowchart of FIG. 7.

FIG. 8 is a screenshot 400a of a software tool created by Wizard builder 100 of FIG. 3, implementing procedural steps S1 and S2 of FIG. 7. In essence, steps S1 and S2 of FIG. 7 involve a single state or step (step 1) and a possible selection corresponding to the step (noting that there is only one possible selection in the current example), which are input into Wizard builder 100. Step 1 required a human response, and thus when creating the software tool resulting in the screenshot of FIG. 8, "H" was input in window 112 of Wizard builder 100 of FIG. 3. The procedure, as displayed in element 450A of FIG. 8, is "PROC 1", which was input into window 108 of Wizard builder 100, and the step S1 is displayed as element 460 in FIG. 8.

The question or process step input into window 142 of Wizard builder 100 of FIG. 3, included step S1, namely "Open cabinet door" and included the further instructions "hit ok when done," and is displayed as element 410a in the created software tool.

Finally, since the only selectable potential selection is "ok", based upon the fact that the flowchart of FIG. 4 is only an example of a simple sequential procedure (with no conditional steps involving multiple choices), a single answer was input in window 154 of Wizard builder 100 of FIG. 3, and is displayed as a display button 420a of FIG. 8. The next state input in window 156 of FIG. 3 of Wizard builder 100 was "2", and the next procedure was procedure PROC 1, input into window 158 of Wizard builder 100 of FIG. 3.

Figure 9:
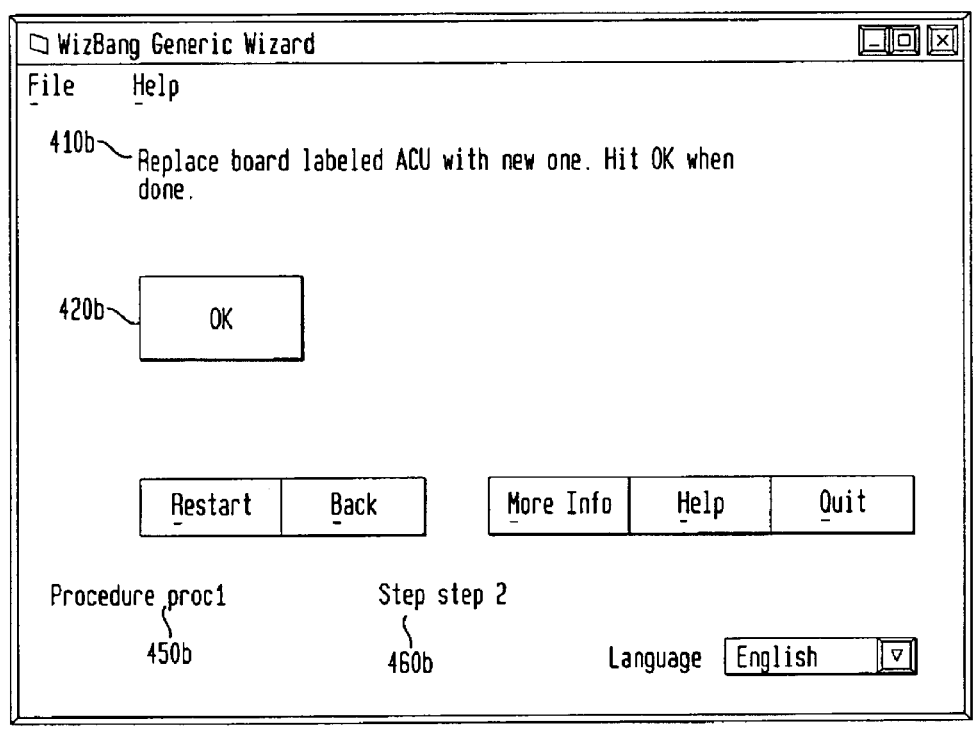

FIG. 9 is a screen shot 400b of the software tool, for steps S3 and S4 of the procedure, somewhat similar to that of screenshot 400a for steps S1 and S2 shown in FIG. 8. The second step of the software tool includes both step S3 and S4 displayed in area 410b, displaying "Replace board labeled ACU with new one. Hit ok when done." Again, the only possible potential selection is "ok", and this is displayed in area 420b of FIG. 9. The procedure remains PROC 1 as displayed in area 450b, and the step is now Step 2 as displayed in area 460b.

Figure 10:
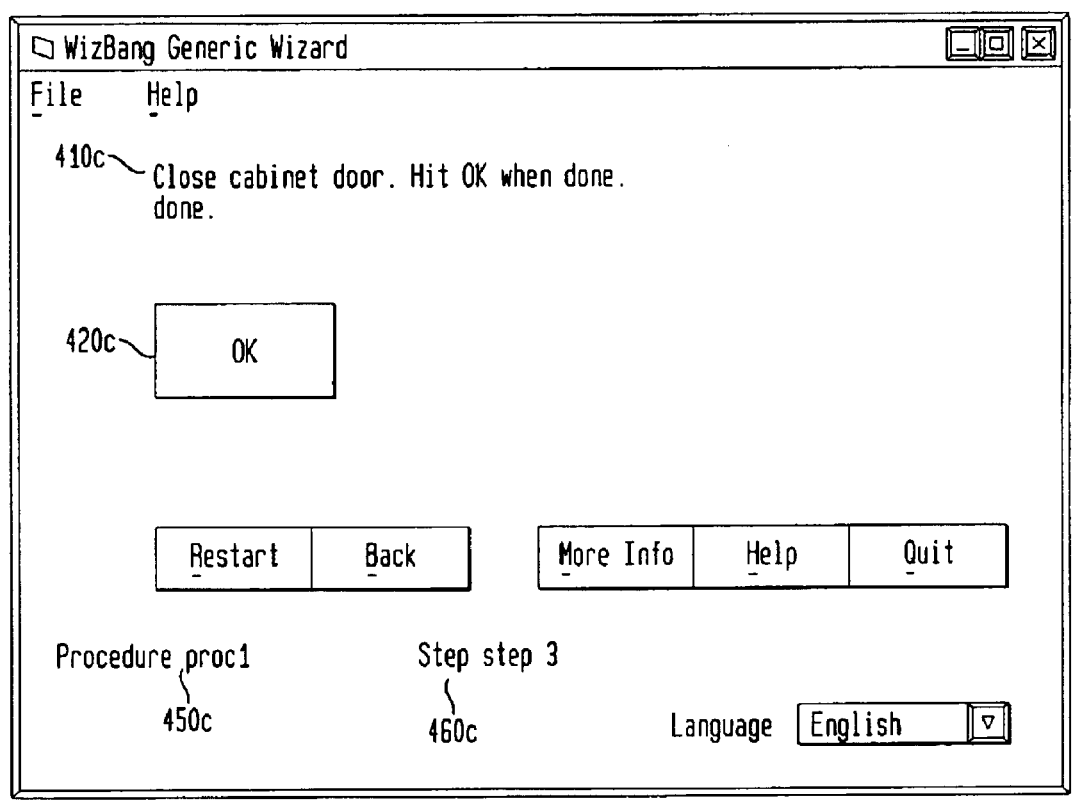

Somewhat similarly, in FIG. 10 in a screenshot 400c of the software tool, for steps 5S and S6 of the procedure. The steps are displayed in area 410c as "Close cabinet door. Hit ok when done." Again, the only potential selection is "ok", and this is displayed as a single button 420c. The procedure remains PROC 1 as displayed in area 450c, and the step is now Step 3 as displayed in area 460c.

Figure 11:
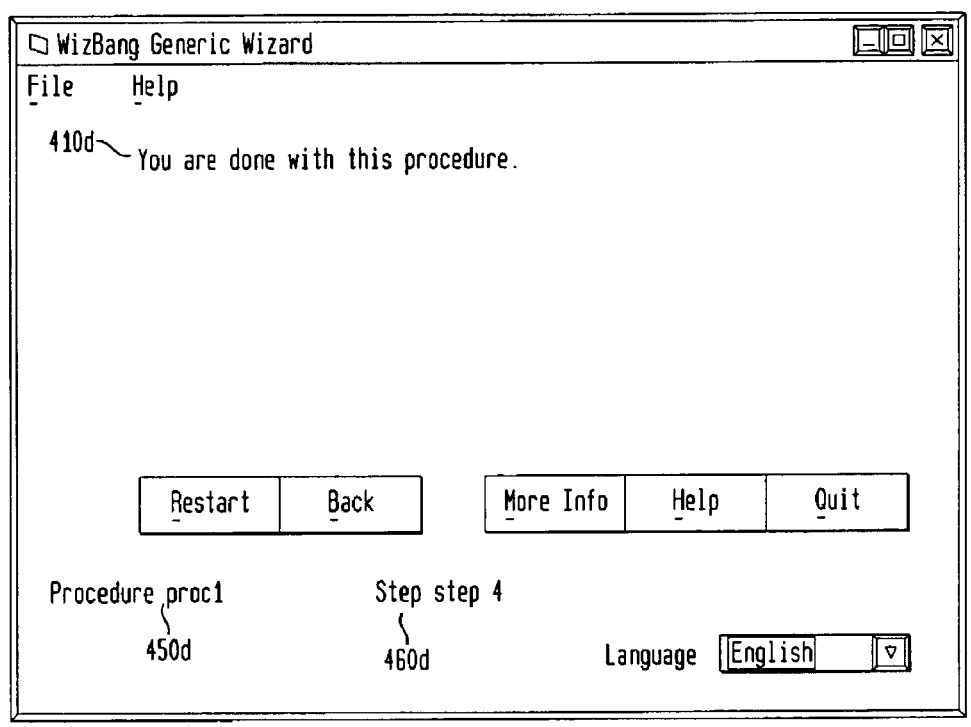

Finally, FIG. 11 is a screenshot 400d of the software tool, for the last step S7 of FIG. 7. The last step 410d is displayed as "You are done with this procedure." No potential selections or answers are displayed, since this is the last step of the procedure. The procedure remains PROC 1 as displayed in area 450d, and the step moves to Step 4 as shown in area 460d.

Accordingly, as shown in FIGS. 8 to 11, the Wizard builder 100 of FIG. 3 is utilized to create a software tool which prompts a user through four display screens, to lead them through a step-by-step procedure. The example shown in FIGS. 7 through 11 is a procedure for repairing a problem in a telecommunication system and illustrates how a complex procedure can be simplified by creating a software tool (Wizard) utilizing the Wizard builder 100 of the present invention.

A second example will be discussed, utilizing FIGS. 12 to 18, indicating conditional steps or multiple potential selections corresponding to a single process step. It should be noted that real-world examples of software tools which can be created by Wizard builder 100 may be far more complex than those shown in either of FIGS. 7 to 11 or 12 to 18.

Figure 12:
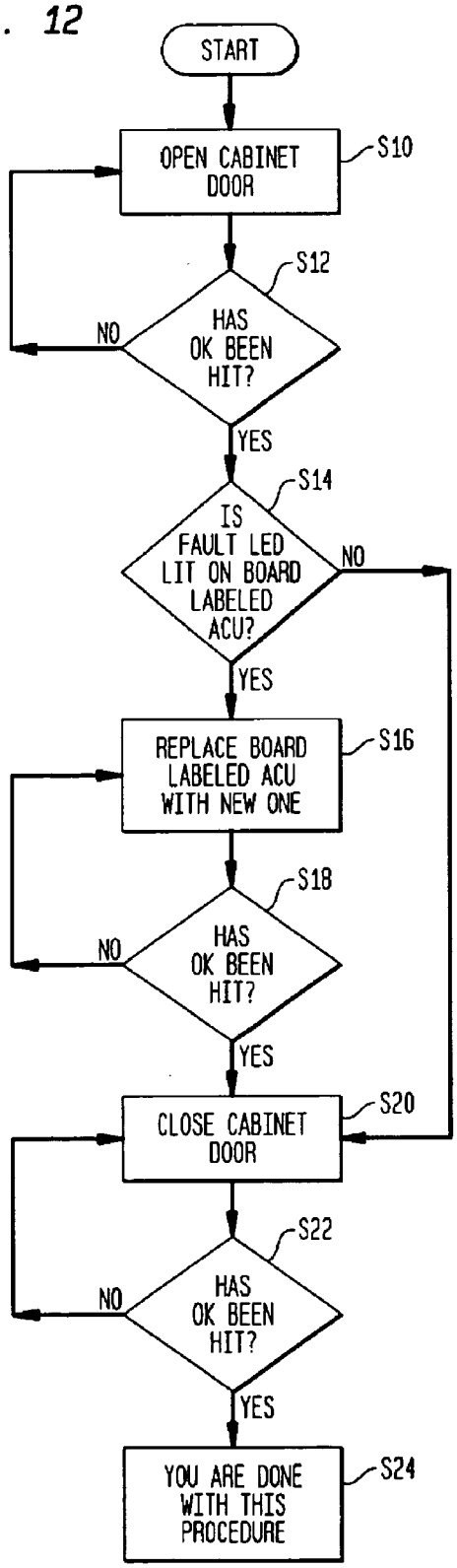
FIG. 12 is a flowchart of a second process to be implemented into a software tool.
Figure 13:
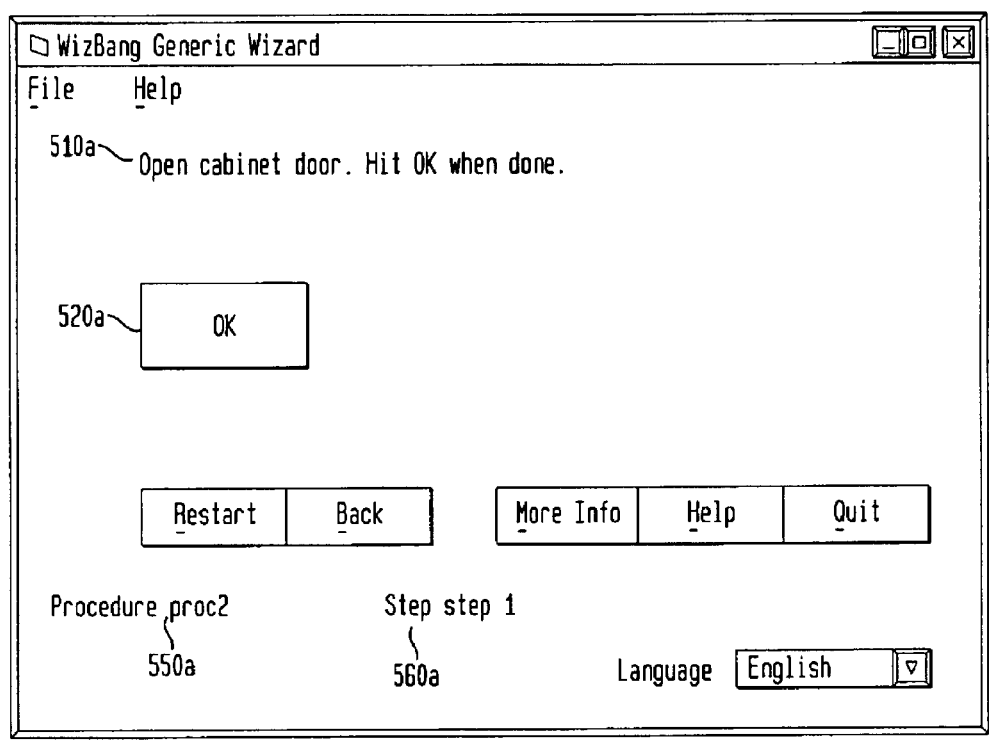
FIGS. 13, 14, 16, 17 and 18 are sample screenshots of a software tool created by the method and apparatus of the present invention to implement the procedure of the flowchart of FIG. 12.

The procedure to be implemented in a form of a software tool (Wizard) is shown in FIG. 12 and includes steps S10, S12, S14, S16, S18, S20, S22 and S24. FIG. 13 is a first screenshot 500a of a software tool created using a Wizard builder 100 of the present invention. The first step in the procedure of FIG. 12 is displayed in area 510a, which essentially encompasses steps S10 and S12 of FIG. 12. Area 510a displays the process step "Open cabinet door. Hit ok when done." Since there is only one potential selection corresponding to the procedure step, this potential selection is displayed as an "ok" button in area 520a. The procedure is identified as procedure 2 in area 550a and the step is indicated as step 1 in area 560a.

Figure 14:
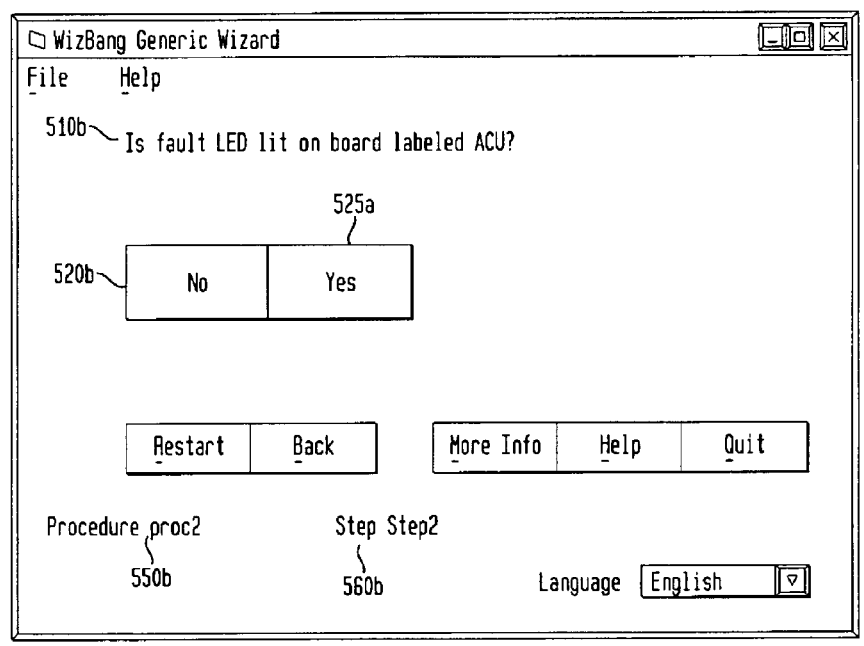

FIG. 14 is a screenshot 500b of the software tool. It illustrates a screenshot with a conditional procedural step. Namely, this corresponds to step S14 of FIG. 12, and the question is displayed in an area 510b as "Is fault LED lit on board labelled ACU?" Instead of just displaying a single potential selection associated with the process step, areas 520b and 525b display two different potential selections, namely a first selection "no" in an area 520b and a second selection "yes" in area 525b. The procedure "PROC 2" is displayed in area 550b and the step, step 2, is displayed in area 560b.

Figure 15:
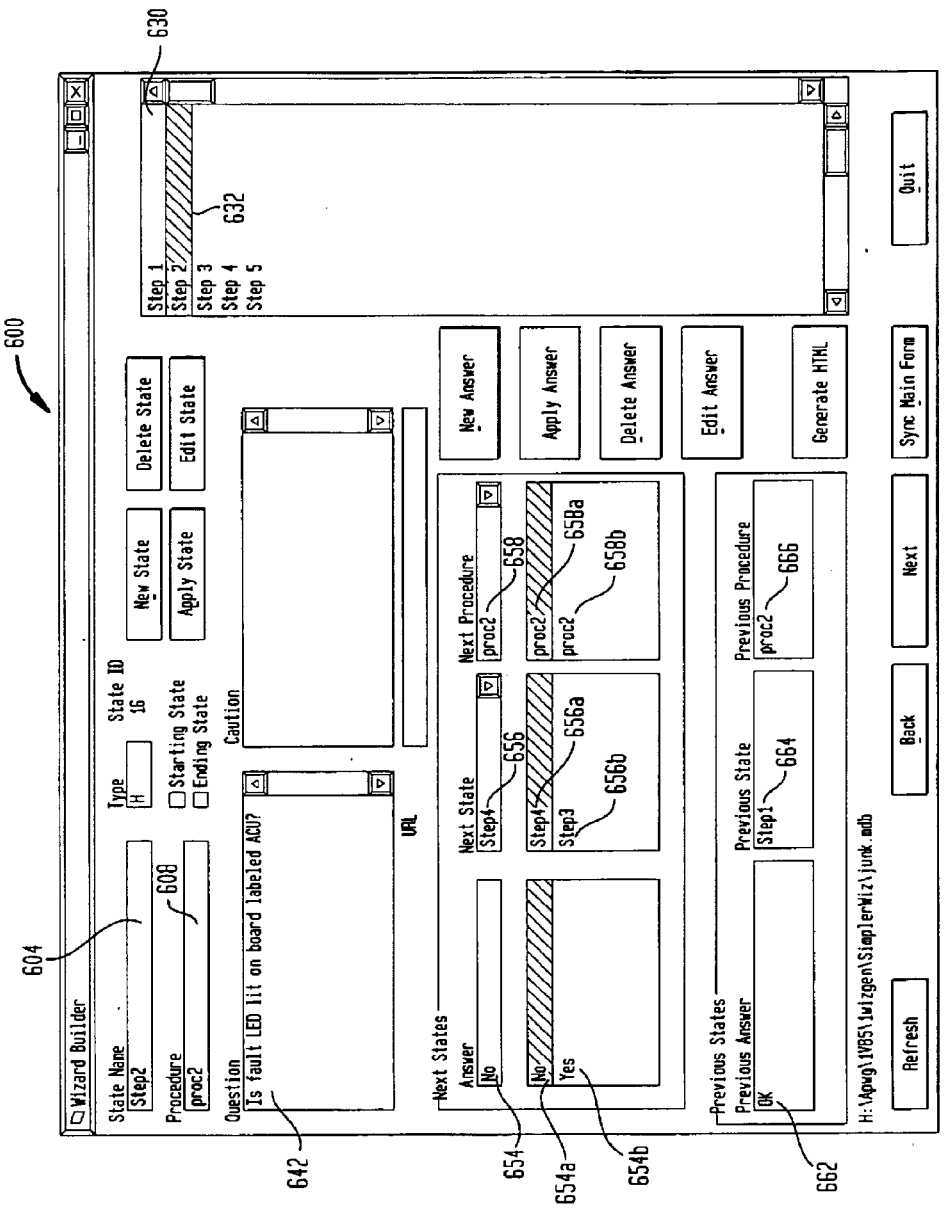
FIG. 15 is a sample screenshot of the software tool creator used to create the software tool screenshot of FIG. 14.

To further illustrate the conditional step of the software tool screenshot of FIG. 14, FIG. 15 is presented. The Wizard builder 600 of FIG. 15 is essentially the same as Wizard builder 100 of FIG. 3, with the exception that the steps, procedures, questions and answers are modified so as to correspond with various steps shown in FIG. 12 and displayed in FIG. 14. As shown in area 630 of wizard builder 600, the software tool implementing the procedure of the flowchart of FIG. 12 is a 5-step procedure, with step 2 being highlighted in area 632 of FIG. 15. This step 2, corresponding to the screenshot of FIG. 14, is the state name shown by step 2 in window 604. The procedure PROC 2 is input into window 608.

As shown by the process step displayed in portion 510b of FIG. 14, the question is initially input into the Wizard builder 600 in area 642. In order to create the two potential selections shown in FIG. 14, the two selections are each input in the "answer" section of the Wizard builder 600 of FIG. 15. For example, the answer or potential selection "yes" is first input as shown in area 654b, with its corresponding next state "step 3" in area 656b, and its corresponding procedure "PROC 2" in area 658b. The second potential answer is input into area 654, and displayed as "no" in area 654a; its corresponding next state is input in area 656 as "step 4", and displayed in area 656a; and its procedure is input in window 658 as "procedure 2", and is displayed in area 658a.

Finally, in the previous "states" section of Wizard builder 600, the previous answer "ok" is displayed in area 662; the previous state "step 1" is displayed in area 664; and the previous procedure "PROC 2", is displayed in area 666. Thus, FIG. 15 illustrates Wizard builder 600, in which the conditional step of step S14, and the conditional "yes" and "no" answers leading from step 14 to different next states, are first input. This then results in the creation of the software tool and the display of screenshot 500b as shown in FIG. 14.

Figure 16:
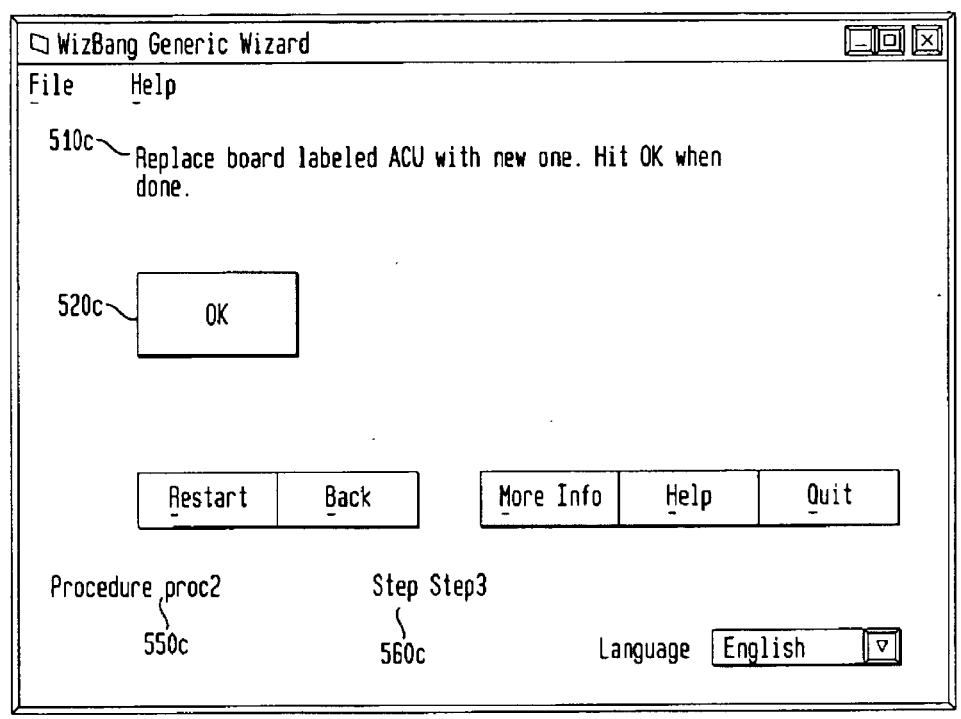

Moving back to the software tool created based upon the flowchart of FIG. 12, FIG. 16 is a screenshot 550c, for step 3 of the software tool procedure, reflecting steps S16 and S18 of FIG. 12. The step, "step 3", is displayed in area 560c, and is only encountered when the answer to step S14 of FIG. 12 is "yes", and when the "yes" button 525b of the screenshot 500b is selected. The procedure remains PROC 2 as displayed in area 550c, and the process step of essentially steps S16 and S18 are displayed in area 510c, namely "Replace board labelled ACU with new one. Hit ok when done." Since the only potential selection associated with the process step is "ok", an "ok" button is displayed in area 520c.

Again, when viewing FIGS. 14 and 16, one can see that the software tool created from the flowchart of FIG. 12 easily enables a user to step through a complex procedure such that when a fault LED is lit on the board labelled ACU, the board labelled ACU will be replaced with a new one based upon a procedure moving from step 2 of the screenshot of FIG. 14 to step 3 of the screenshot of FIG. 16. To the contrary, if "no" is selected in the step of the software tool shown in the screenshot of FIG. 14, then the software tool will not display the screenshot shown in FIG. 16, but will instead display the screenshot of FIG. 17.

Figure 17:
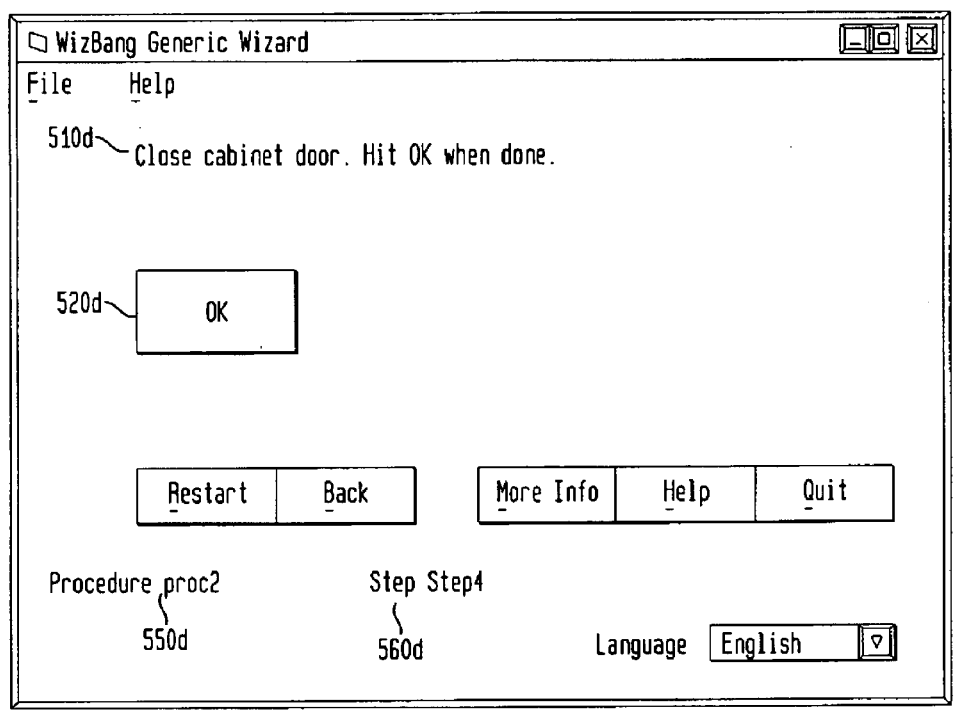

FIG. 17 is a screenshot 500*d* which, in essence, represents steps S20 and S22 of FIG. 12, and is essentially step 4 in a 5-step software tool procedure. Step 4 is displayed in area 560*d*, with the procedure remaining PROC 2, as displayed in area 550*d*. The screenshot 500*d* of FIG. 17 displays the process step of steps S20 and S22 as "Close cabinet door. Hit ok when done." in area 510*d*, and displays a single potential selection "ok" in area 520*d*.

Figure 18:
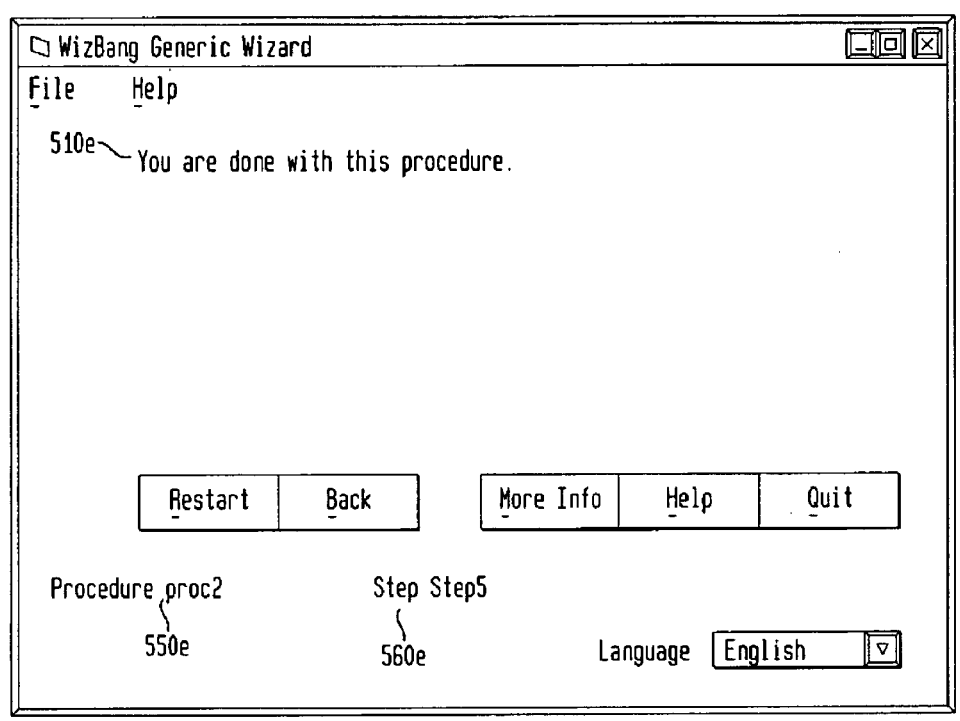

Thereafter, the process proceeds to step S24, which is reflected in the fifth screenshot 500*e* of the created software tool shown in FIG. 18. The phrase "You are done with this procedure." is displayed in area 510*e*. Since this is the end of the procedure, no potential selections are displayed. The procedure is again displayed as PROC 2 in area 550*e* and the step, as indicated by step 5, is indicated in 560*e*.

Accordingly, in this second example shown in FIGS. 14 to 18, a 5-step software tool is created by the method and apparatus of the present invention, from the conditional procedure illustrated by the flowchart of FIG. 12. Similar to the first example given, the procedure of FIG. 12 is basically a step-by-step procedure, demonstrating a multiple choice answer wherein, depending upon the selection made by the user, a new screenshot of the created software tool is displayed.

Accordingly, with the Wizard builder of the present invention, a user is prompted to input process steps of a procedure, and a plurality of potential selections, either visually or audibly for example. A state or step of the procedure is essentially a state of a finite state machine, and corresponds to a step of a procedure or question of either a human end-user, of another system or machine, or of another program of a machine. The Wizard builder 100, FIG. 3 prompts input of process steps, potential selections associated with each of the process steps; stores the input process steps and associated potential selections; and creates a software tool, such as that displayed in FIGS. 13, 14 and 16–18.

Additionally, next states can be prompted, or automatically generated if only a single potential selection corresponds to an input process step. A URL address (world-wide-web uniform resource locator) may be used to provide additional information (such as "help", for example) and can be input into the Wizard builder. The Wizard builder can be used to designate a state as a starting state, an ending state, and also can prompt next state information or retrieve such information from a prestored state transition table.

As in any finite state machine, a set of state transitions, specifying how a machine moves from state-to-state in response to inputs, is prompted and input to the Wizard builder 100 of FIG. 3 of the present invention. Further, the Wizard builder of the present invention allows for not only the creation of a software tool, but also the creation of a software tool which is easily modifiable by the user wherein states can be added, applied and deleted and answers or potential selections corresponding to a state can be added, applied, deleted or edited.

Figure 2:
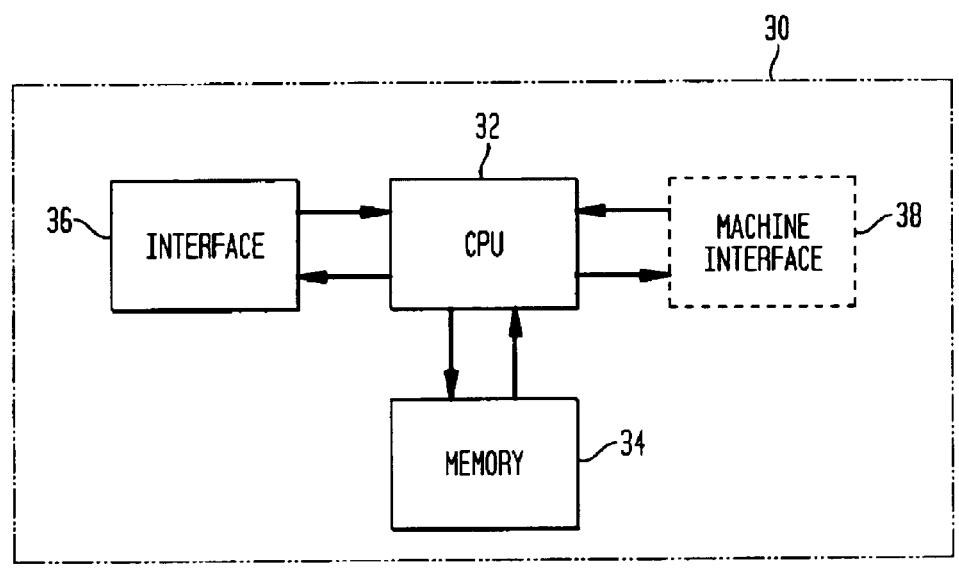
FIG. 2 illustrates a hardware diagram used for implementing the present invention.
Figure 19:
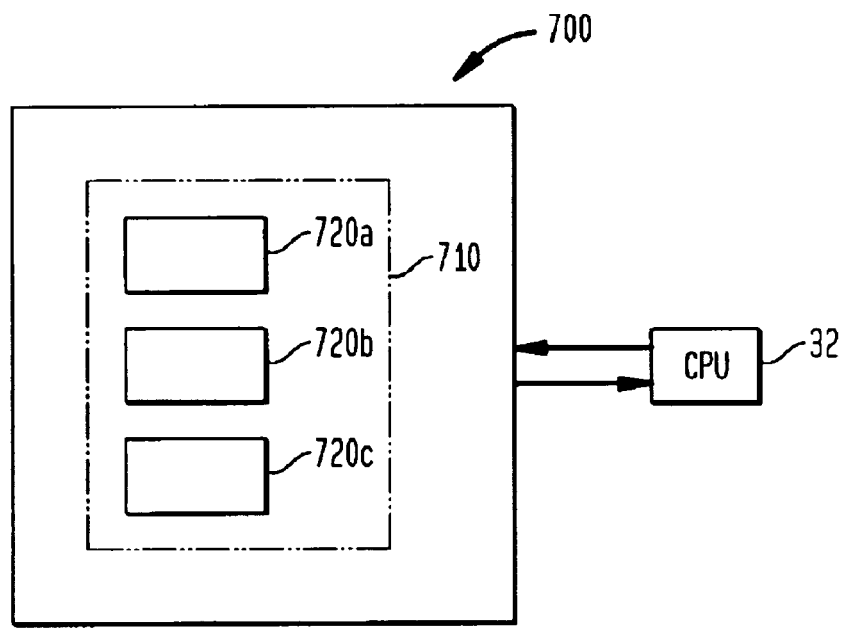
FIG. 19 is an article of manufacture implementing the present invention.

In addition, the present invention should not be limited to an apparatus implemented by a CPU, memory and interface as shown in FIGS. 2 and 3 of the present invention. The invention may also be implemented in other forms, such as an article of manufacture as shown in FIG. 19, for example. Essentially, the entire Wizard builder 100 of the present invention can be implemented in the form of an article of manufacture, 700, as shown in FIG. 19 such as a computer disk, optical disk, CD ROM, or other medium storing the information necessary to create the Wizard builder 100 of FIG. 3. The article of manufacture 700 preferably comprises a computer usable medium such as a memory 710 (which may be a computer disk, RAM, ROM, optical disk, etc.) including a first code 720A for causing a computer (such as CPU 32 for example) to prompt input of process steps and a plurality of potential selections associated with each of the process steps; a second code 720B for causing a computer to store input process steps and associated potential selections; and a third code 720C for causing a computer to create a software tool based upon the stored process steps and associated potential selections. The various codes cause the computer to prompt a displayed template such as that shown in FIG. 3 of the in present application corresponding to a Wizard builder 100, or cause the computer to audibly prompt information, for example.

Figure 20:
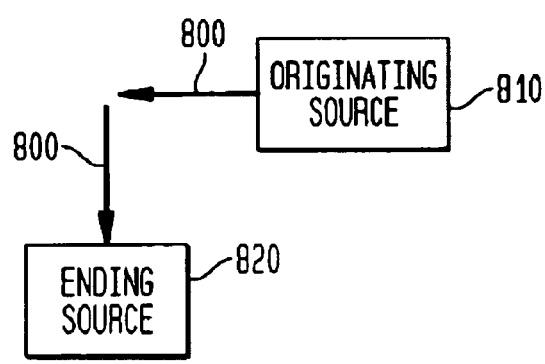
FIG. 20 is a propagated signal implementing the present invention.

Alternatively, as shown in FIG. 20, the Wizard builder 100 can be implemented in the form of a propagated signal 800, transmitted from one source 810 to another source 820, for example. The first source 810, sends the propagated signal, including a first code segment instructing prompting input of process steps in a plurality of potential selections associated with each of the process steps; a second code segment instructing storage of input process steps and associated potential selections; and a third code segment instructing creation of a software tool based upon the stored process steps in associated potential selections. The signal 800 containing such information is then propagated over the world-wide web, through air-waves, etc., to a second location 820, including a computer (such as CPU 32, for example) for receiving the propagated signal, for example. Such a propagated signal is one embodied in a digital signal, a digital bit-stream, or a carrier wave for example. The code segments instruct prompting via a display template, audible prompting, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for creating a wizard, comprising:

prompting a plurality of input process steps and a plurality of potential selections associated with each of the input process steps, the plurality of input process steps being displayed concurrently in the wizard, and each of the plurality of input process steps including a corresponding plurality of potential selections which are displayed in the same displayed wizard;

storing the plurality of input process steps and associated potential selections; and using the plurality of stored input process steps and associated potential selections to create the wizard for outputting the input process steps based upon input selections.

2. The method of claim 1, wherein the prompting is performed by a displayed template.

3. The method of claim 1, wherein the prompting is audible.

4. The method of claim 1, wherein input of a designation is further prompted and stored, associating a potential selection with a subsequent process step.

5. The method of claim 1, wherein one of the potential selections permits input of a character string.

6. The method of claim 1, wherein the created wizard is displayed.

7. The method of claim 6, wherein the created wizard is displayed as sequential process steps with potential selections.

8. The method of claim 7, wherein each of the plurality of sequential steps in a process is displayed concurrent with a single step and associated potential selections.

9. The method of claim 1, wherein input of a query is prompted as a process step.

10. The method of claim 9, wherein potential answers to the query are prompted as associated potential selections.

11. The method of claim 1, further comprising storing the created wizard.

12. The method of claim 11, wherein at least one of a stored process step and potential selection in the created wizard is modifiable.

13. The method of claim 1, further comprising prompting and storing input of a designation, associated with a process step, indicating one of machine and non-machine processing.

14. The method of claim 13, wherein upon receiving an input designation indicating machine processing, further input of information relating to the machine processing is prompted.

15. The method of claim 13, further comprising:
accessing prestored information upon receiving an input designation indicating machine processing.

16. The method of claim 15, wherein the prestored information is stored in a relational database.

17. The method of claim 16, wherein the prestored information includes information stored in a text file including a state transition table.

18. The method of claim 1, wherein the created wizard sequentially conveys each of the input process steps and prompts selection of a potential selection for each process step.

19. The method of claim 18, wherein the created wizard sequentially displays each of the input process steps.

20. The method of claim 18, wherein the created wizard audibly sequentially outputs each of the input process steps.

21. The method of claim 18, wherein conveyance of a process step is dependent upon a selection made in response to a previously conveyed process step.

22. The method of claim 1, further comprising:
accessing prestored information and creating the wizard, at least in part, based upon the prestored information.

23. The method of claim 22, wherein the prestored information is stored in a relational database.

24. The method of claim 23, wherein the additional information includes a URL.

25. The method of claim 22, wherein the prestored information includes information stored in a text file including a state table.

26. The method of claim 1, further comprising:
storing additional information associated with at least one of a process step and potential selection.

27. The method of claim 1, further comprising:
selecting from a plurality of languages in which prompting will occur.

28. The method of claim 1, wherein the prompting input of process steps and a plurality of potential selections associated with each of the process steps includes presenting at least one input field to receive the process steps.

29. A wizard creator, comprising:
a user interface, adapted to a plurality of prompt input of process steps and potential selections associated with each of the input process steps, the plurality of input process steps being displayed concurrently in the wizard, and each of the plurality of input process steps including a corresponding plurality of potential selections which are displayed in the same displayed wizard;
a memory adapted to store the plurality of input process steps and associated potential selections; and
a processor, adapted to create a wizard based upon the plurality of stored process steps and associated potential selections.

30. The wizard creator of claim 29, wherein the user interface is displayed.

31. The wizard creator of claim 30, wherein the user interface is an integrated input and display.

32. The wizard creator of claim 30, wherein the user interface is a touch-screen.

33. The wizard creator of claim 30, wherein the memory is adapted to store audibly input process steps and associated potential selections.

34. The wizard creator of claim 29, wherein the user interface prompts audibly.

35. The wizard creator of claim 29, wherein the user interface is further adapted to prompt input of a designation, associating a potential selection with a subsequent process step.

36. The wizard creator of claim 29, wherein one of the potential selections permits input of a character string.

37. The wizard creator of claim 29, wherein the user interface prompts input of a query as a process step.

38. The wizard creator of claim 37, wherein the user interface prompts input of potential answers to a query as associated potential selections.

39. The wizard creator of claim 29, wherein the memory is further adapted to store the created wizard.

40. The wizard creator of claim 29, wherein at least one of a stored process step and potential selection in the created wizard is modifiable through the user interface.

41. The wizard creator of claim 29, wherein the user interface further prompts input of a designation, associated with a process step, indicating one of machine and non-machine processing.

42. The wizard creator of claim 41, wherein the user interface further prompts input of information relating to the machine processing upon receiving an input of a designation indicating machine processing.

43. The wizard creator of claim 42, wherein the user interface further prompts input of a machine connection.

44. The wizard creator of claim 43, wherein the input of the machine connection includes input of a URL.

45. An article of manufacture, comprising:
a computer usable medium including,
first code for causing a computer to prompt a plurality of input process steps and a plurality of potential selections associated with each of the input process steps, the plurality of input process steps being displayed concurrently in the wizard, and each of the plurality of input process steps including a corresponding plurality of potential selections which are displayed in the same displayed wizard;
second code for causing a computer to store the plurality of input process steps and associated potential selections; and
third code for causing a computer to create the wizard based upon the plurality of stored process steps and associated potential selections.

46. The article of manufacture of claim 45, wherein the first code causes the computer to prompt via a displayed template.

47. The article of manufacture of claim 45, wherein the first code causes the computer to audibly prompt.

48. The article of manufacture of claim 45, wherein the first code and second code respectively cause the computer to further prompt and store an input designation, associating a potential selection with a subsequent process step.

49. The article of manufacture of claim 45, wherein the first code causes the computer to prompt input of queries as the process steps.

50. The article of manufacture of claim 49, wherein the first code causes the computer to prompt input of potential answers to the queries as the associated potential selections.

51. The article of manufacture of claim 45, wherein the first code and second code respectively cause the computer to prompt and store an input designation, associated with a process step, indicating one of machine and non-machine processing.

52. The article of manufacture of claim 51, wherein the first and second code respectively cause the computer to prompt and store input of information relating to the machine processing upon receiving an input of a designation indicating machine processing.

53. A computer system with a propagated signal, comprising:

a first code segment instructing prompting a plurality of input process steps and a plurality of potential selections associated with each of the process steps, the plurality of input process steps being displayed concurrently in the wizard, and each of the plurality of input process steps including a corresponding plurality of potential selections which are displayed in the same displayed wizard;

a second code segment instructing storage of the plurality of input process steps and associated potential selections; and a third code segment instructing creation of the wizard based upon the plurality of stored process steps and associated potential selections.

54. The propagated signal of claim 53, wherein the propagated signal is embodied in a digital signal.

55. The propagated signal of claim 53, wherein the propagated signal is embodied in a digital bit stream.

56. The propagated signal of claim 53, wherein the propagated signal is embodied in a carrier wave.

57. The propagated signal of claim 53, wherein the first code segment instructs prompting via a displayed template.

58. The propagated signal of claim 53, wherein the first code segment instructs audible prompting.

59. The propagated signal of claim 53, wherein the first and second code segment respectively instruct prompting of input and storage of an input designation, associating a potential selection with a subsequent process step.

60. The propagated signal of claim 53, wherein the first code segment instructs prompting of input of queries as process steps.

61. The propagated signal of claim 60, wherein the first code segment instructs prompting of input of potential answers to the queries as the associated potential selections.

62. The propagated signal of claim 53, wherein the first code segment and second code segment respectfully instruct prompting of input and storage of an input designation, associated with a process step, and indicating one of machine and non-machine processing.

63. The propagated signal of claim 62, wherein the first and second code segments respectively instruct prompting of input and storage of input of information relating to the machine processing in response to receiving input of a designation indicating machine processing.

64. A method for creating a wizard, comprising:

prompting a plurality of input process steps;

storing the plurality of input process steps; and using the stored plurality of input process steps to create a wizard for outputting the input process steps based upon a plurality of input selections, the plurality of input process steps being displayed concurrently in the created wizard, and each of the plurality of input process steps including a corresponding plurality of input selections which are displayed in the same displayed wizard.

* * * * *